Oct. 17, 1950 | P. F. M. GLOESS | 2,525,893

TELEMETERING SYSTEM

Filed Feb. 11, 1949 | 4 Sheets-Sheet 1

Inventor:
Paul F. M. Gloess
by: Samuel Schonitz
Attorney

TELEMETERING SYSTEM

Filed Feb. 11, 1949 4 Sheets-Sheet 2

Inventor:
Paul F. M. Gloess
by: Samuel Blomty
Attorney

Inventor:
Paul F.M. Gloess
by: Samuel Feloniz[illegible]
Attorney

Oct. 17, 1950 P. F. M. GLOESS 2,525,893

TELEMETERING SYSTEM

Filed Feb. 11, 1949 4 Sheets-Sheet 4

Inventor:
Paul F. M. Gloess
by: Samuel Selowitz
Attorney

Patented Oct. 17, 1950

2,525,893

UNITED STATES PATENT OFFICE 2,525,893

TELEMETERING SYSTEM

Paul François Marie Gloess, Paris, France

Application February 11, 1949, Serial No. 75,936
In France March 12, 1948

16 Claims. (Cl. 177—351)

The invention relates to transmission at distance of a variable position and more particularly to remote measuring, by using short time displaced electrical pulses.

It has for its object to provide a new method and system of transmitting at distance, in a continuous manner, the position of a variable or mobile element, and more particularly of a mobile part of a meter, which system is easy to manufacture, working reliably with a high precision, and with no friction nor inertia effect, enabling thereby transmission at a relatively high rate.

It has also for its object a new method of continuous transmission at distance of the position of a mobile element respectively to a fixed origin or starting point, intended more particularly to reproduce at a distance the portion of a meter scale swept by its pointer along a predetermined trajectory.

It has also for its object an improved method and system of transmission to a remote observation station of the instantaneous positions of several mobile elements by means of a single link between the transmitter and receiver, such as a single carrier or a single coaxial line, enabling thus the simplification of the apparatus used and the substantial reduction of its weight, and it is therefore of a particular interest for remote controlling or surveying of aircraft and similar engines, carrying numerous meters on their instrument boards.

It has also for its object a new type of generator of position modulated pulses, more particularly intended for telemetering purposes, controlled directly and continuously by a movable modulator part operating without friction, and the movement of which is practically instantaneously transformed into pulse displacements.

According to one feature of my invention, the position of a mobile part, such as a pointer of a meter, is transmitted by means of a recurrent short pulse which is produced at the moment corresponding to the instantaneous position of the pointer.

According to still another feature of my invention, the position pulse is accompanied by a particular fixed reference or pilot pulse of a periodic recurrent character, the time interval between these positions and reference pulses corresponding to the momentary position to be observed. In cases where this reference pulse would correspond to the starting position of a movable element, such as the zero of a meter scale, this variable time interval would then represent exactly the meter reading.

According to still another feature of my invention, the position modulated pulses are produced by means of a generator comprising a delay network of an elongated form fed with recurrent timing or energizing pulses and swept lengthwise in a continuous and a direct manner by a movable element, the position of which is to be transmitted. These recurrent pulses, preferably of a periodic character, may be used directly as the aforesaid pilot or reference pulses; the latter may also be derived from these energizing pulses, provided that a fixed time relation be kept between them.

According to still another feature of my invention, this generator comprises an artificial line with continuously and unformly distributed inductance and capacity, made preferably by a wire coiled in the form of a helix, and a movable pick up sweeping it lengthwise and producing by the effect of the induction coupling, a position pulse the time lag of which is determined by the momentary position of this pick up. If the latter is fastened to the pointer of a meter, this time lag will represent the needle movement. This pick-up will act as a movable coupler connecting in series the means feeding the artificial line with a recurrent pulse, and the output circuit, through a variable portion of this line, the length of which is determined by the momentary position of said coupler. The position pulse appearing at this output will thus present in respect to the said feeding pulse a time lag correspond to the delay in the said portion and thus representing the needle position.

According to still another feature of my invention, this pick-up is formed by a movable capacitive coupling, and more precisely by means of a piece of substance changing the capacitive coupling between the artificial line and a collecting electrode.

According to still another feature of my invention, the pilot pulse is generated by the artificial line itself, by using a supplementary capacitive coupling placed near the input of the line, and receiving preferably a suitable design, in order to give rise to a pulse of a particular shape enabling its selection at the receiver.

According to still another feature of my invention the position pulse generator comprises an artificial line conducting a recurrent travelling pulse, and which is under direct action of the body, the position of which is to be transmitted. The latter changes the transmission properties of the line and, for instance, acting as a reflector, gives rise to an electric-pulse, at the instant determined by the body's level; this position pulse may be picked-up directly at the input of the line. This simplified apparatus may be more particularly used for the measurement of liquid column heights and the like.

According to still another feature of my invention, the transmitted pulses are reproduced at the remote observation station, by means of a cathode ray tube apparatus working practically at the same conditions as a television receiver. The pilot pulses, after being selected, in a conventional manner, are used to synchronise the time base of the screen sweeping, whereas the position pulses give rise to a brilliant mark on the screen spaced apart from the origin of the time base controlled by the pilot pulses, to an amount corresponding to the transmitted position.

According to still another feature of my invention, several artificial lines are energized simultaneously, each transforming into time displaced pulses, the position of a corresponding meter; all these lines being fed in series by a single supply generator, the recurrent pulses of which produce in each line successively pilot and position pulses. Furthermore a supplementary pulse of a particular form is produced at the beginning of each transforming cycle. The latter pulse is used in the cathode ray receiver to secure the vertical deflection and to separate the horizontal time bases corresponding to the different remote meters, in order to read all their indications on the same screen.

The novel features that I consider characteristic of my invention are set forth in detail in the appended claims. The invention itself, however, both as to its organization and method and advantages thereof, will be best understood from the following description of the several embodiments thereof, when read in connection with the accompanying drawings, in which:

Figure 1 is a schematic plan view of a mobile needle meter, combined, according to my invention, with an artificial line, the connection between them being secured by a movable capacitive coupling, Figure 1A is a cross-sectional view of the apparatus made, according to Figure 1, with slightly modified sizes and distances, enabling the better understanding of the line construction and the relative positions of different elements of the capacitive pick-up.

Figure 1:
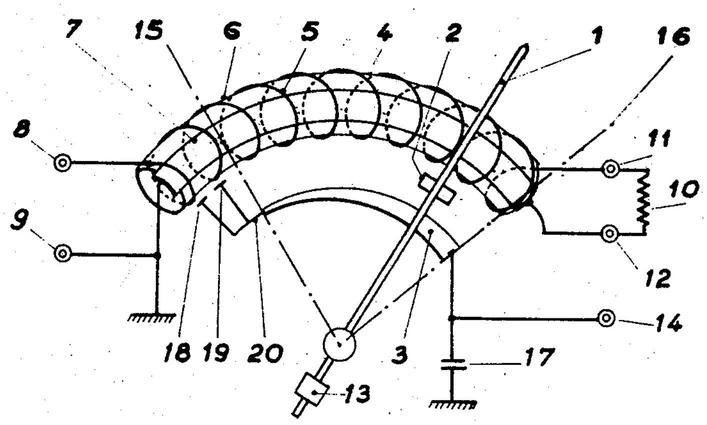
Figure 1B is an electric diagram thereof.
Figure 1A:
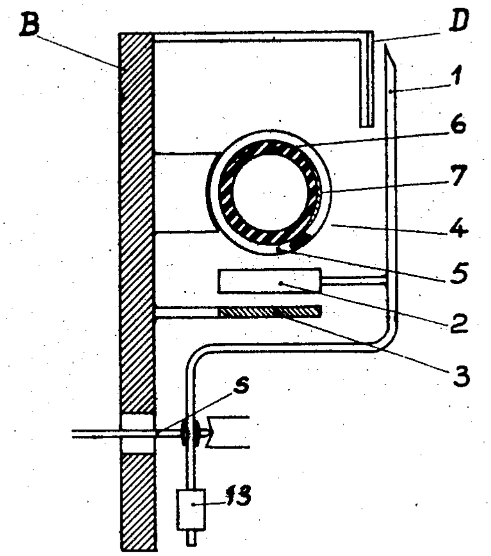

Referring more particularly to the drawing wherein similar reference characters designate corresponding parts throughout, there is shown in the Figures 1 and 1A, a conventional electric meter comprising a needle or a pointer 1, fixed to a rotating shaft S, and sweeping a reading dial D both supported by a base plate B of the meter. The meter may be of a standard electro-magnetic type used to measure voltage or current or the like; and it is therefore not necessary to show its driving parts. A vane 2 is fixed on this pointer and moves with it. It may be made of a folded metallic sheet, or of a high dielectric material such as titanium dioxide in the shape of a probe, and in both cases will have a substantial radial length. If the pointer and the vane are both metallic, they would be preferably insulated from each other. This vane is placed beneath the needle, between a continuous flat-shaped electrode 3, and an artificial line 4, in a capacitive relationship. Both are given a curved concentrical form having the axis S as a centre. When the pointer rotates, the vane will move between the line and the electrode 3 and it will in cases where it is of a metallic nature, act as an intermediate armature reducing the width of the dielectric medium, and in cases where it is an insulator, it will thus introduce an intermediate block of a high dielectric constant; in both cases its presence will increase locally and very substantially the capacity between these outer elements. The point of this sudden important change will move with the vane along the line.

In order to increase the accuracy of the operation, and to check off the slightest variation of the meter reading, this line consists of as great a number as possible of elementary cells comprising each a series inductance and a parallel capacitor.

Figure 1B:
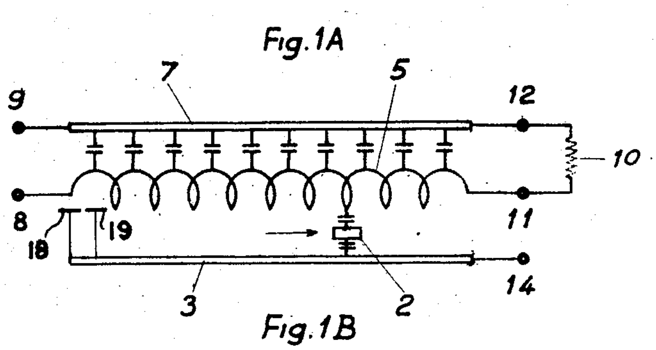

The highest precision is secured by using a continuous structure such as represented in this figure. It is formed by an insulated wire 5 having a uniformly distributed self-inductance wound on a curved insulating tubing or core 6 and a lengthwise extending band 7 thereof being made conductive by the spraying or painting of a conducting substance thereon, or by cutting a wide slot in the core and inserting therein a metallic strip. This transmission line forms a continuous sequence of series-connected inductances represented by the successive turns of the coil 6, combined with uniformly distributed parallel capacities, as is symbolically represented in the Figure 1B. The latter are formed by the elementary capacities existing between the portion of the wire 5 opposite and near the strip 7 on one side and the last-mentioned strip on the other side. To increase these capacities the band 7 may be given a substantial width. The wire and the strip form the two conductors of the line.

The coil is connected to an input terminal 8, whereas the strip 7 leads to another input terminal 9, which is grounded. They are connected on their other end to the terminals 11 and 12 between which is inserted an appropriate matching rseistance 10. The pitch of the coil turns is made uniform in order to secure along its entire length a uniform delaying effect. Preferably the turns of the helix will be given a contacting relation. The flat band 3 acting as a collecting electrode and forming an armature of a capacitive feeble coupling with the line, is preferably given a width that increases continuously from left to right. The mobile vane 2 changes the coupling between the line and this band. The latter is connected to a terminal 14, on which appears the delayed position pulses to be transmitted at a distance. A condenser 17 may be used between the terminal 14 and the ground, to form a voltage divider with the total capacity of the line 4, of the vane 2 and of the collector strip 3. But, practically, the distributed capacity of the connecting line to the terminal 14 would be sufficient to fix the voltage distribution and to avoid any travelling pulse deformation. In order to counterbalance the weight of the vane which, although relatively very small, may unbalance the meter, a supplementary weight 13 may be added to the pointer.

Two supplementary electrodes 18 and 19 intended to collect pilot pulses of a particular characteristic shape, are placed opposite and near the beginning of the line 4, and form a capacitive coupling with it. They are connected by a conductor 20 to the collecting plate 3.

It can be noted on the Figure 1, that as the width of the collecting strip 3 increases gradually from left to right; the capacity of the coupling will increase in the same manner, this compensating the attenuation effect of the artificial line and maintaining constant the signal amplitude on the terminal 14. The same result may be secured by approaching gradually a collecting strip of a constant width, to the line from left to right, or in any other equivalent suitable manner.

To put this apparatus into operating conditions, short recurrent energizing electric pulses are successively applied between the terminals 8 and 9. They will be preferably of a periodic character and may be generated by any appropriate timing pulse generator, connected to 8 and 9, such as a multivibrator or a relaxation oscillator as generally used at present, and do not need to be represented. Each energizing pulse will travel along the line 4, and will reach after a certain delay, due to the line constants, the matching resistance 10 and will be damped there with no reflection effect. The mobile vane 2 increasing greatly, in the position it occupies at a given instant, the capacitive coupling between the line and the collector 3 will act as a mobile capacitive pick-up and transmit the travelling pulse through the collector 3, to the output terminal 14, where it will appear as a characteristic position pulse.

The moment of this collecting effect is determined by the vane position on the line, and it is therefore a function of the position the meter pointer will occupy along its trajectory between its sweeping limits represented by the two radii 15 and 16. Assuming that the pointer will move from left to right, the picked up pulses will be more and more delayed relative to the one produced when the pointer occupied the starting position 15. Owing to the uniformly distributed characteristics of the line, the energizing pulse will travel there with a constant speed, and consequently a particular pulse with a characteristic time lag will correspond to each pointer position.

In most practical cases, in order to differentiate and check off the position pulses and reproduce their time lags, it is necessary to introduce in the transmission a fixed time reference. It can be done by means of a reference or pilot pulse, of a recurrent character, but which is fixed in time. Each position pulse may be accompanied by such a pilot pulse and the time interval between them will then represent the instantaneous position of the meter pointer. This pilot pulse must be generated at a fixed rate time relation with the feeding pulse energizing the line and be of a particular shape enabling its selection. It may differ from the position pulses by its length, polarity, amplitude, composition, or the like. These reference pulses which act as pilot signals relative to the position pulses, may be directly supplied by the oscillator feeding the artificial line, working at a fixed frequency, they can also be furnished, in order to increase the precision and simplify the equipment, by the artificial line generator itself, as is represented in Figure 1. The two supplementary capacitive couplings 18 and 19 will pick up from the energizing travelling pulse, two succeeding pips which, after passing through the collector 3, will appear at the beginning of each energizing cycle, on the output terminal 14.

Figure 2:
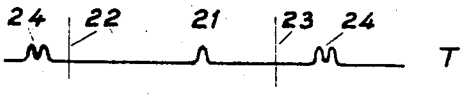
Figure 2 is a diagram of pulses generated by this apparatus.

Figure 2 represents the time diagram of signals appearing on this terminal. The pulse 21, which can move between the limits 22—23 corresponding to the radii 15 and 16 of the Figure 1, represents the delayed position pulse picked up by means of the vane 2, and corresponds to the instantaneous position of the pointer. The twin pips signal 24 induced through the armatures 18 and 19, represents the pilot pulse the total length of which is substantially greater than that of the pulse 21 and which is used to fix the origin of the time base. The time interval between the pulses 24 and 21 will then represent the instantaneous pointer position and will vary with the latter.

Figure 3:
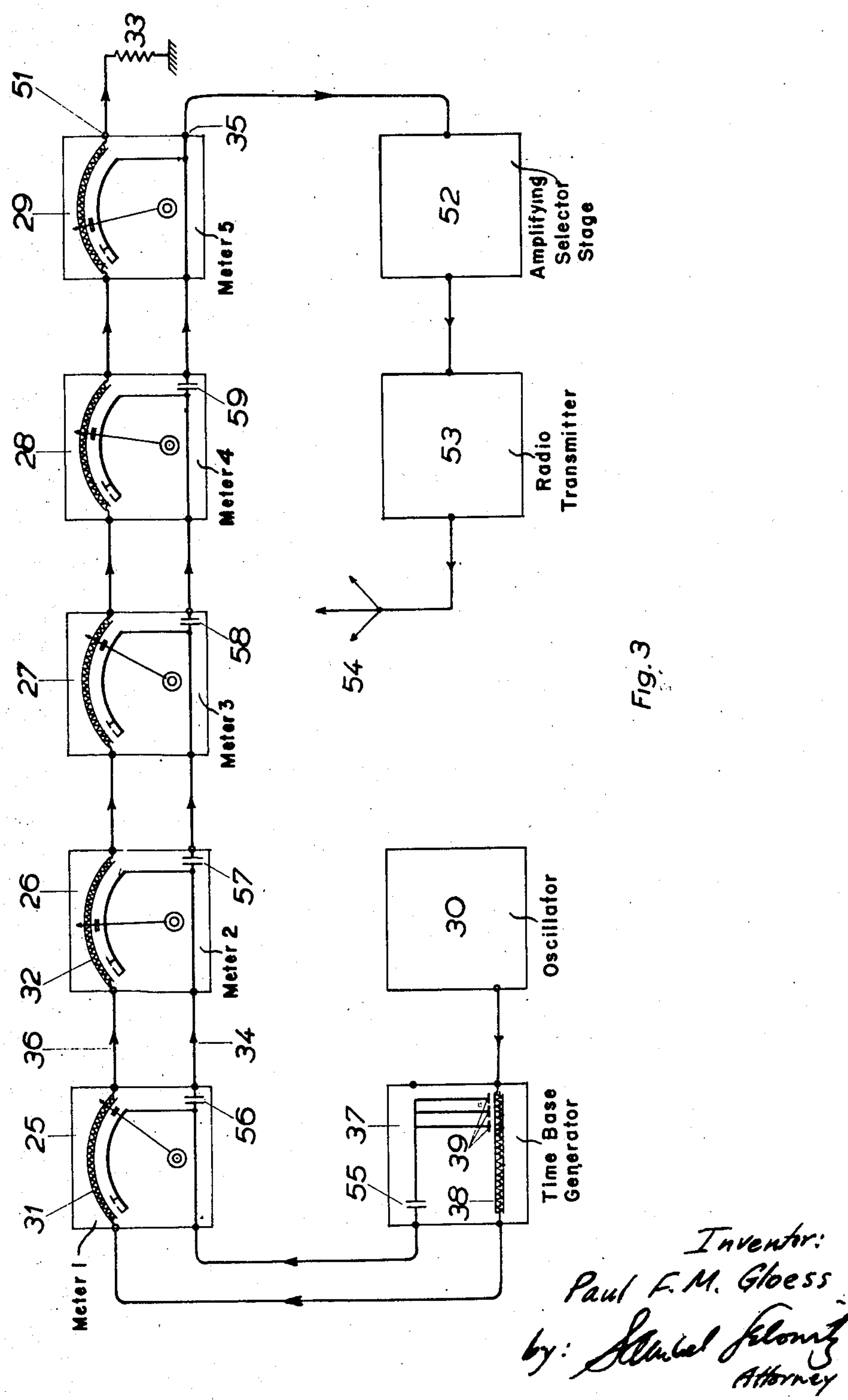
Figure 3 is a schematic view of a single radio transmitter comprising several meters associated with several series connected position modulating generators, made according to this invention, each of them transforming into position pulses, the reading of a corresponding meter.

Figure 3 represents a complete transmitting system embodying several meters arranged according to the Figure 1. There are represented five of them connected in series, but it is evident that their number may be substantially increased. Element 30 is an energizing oscillator of an appropriate type known in the art, producing periodic pulses at the chosen rate and of a proper energy level. It feeds the artificial line 38 of a supplementary time base generator 37, which is connected to the first meter 25. The artificial line 31 of the latter is connected by its input to the line 38 and by its output and through the connector 36 to the artificial line 32 of the second meter 26. The following meters 27, 28 and 29 are connected in the same manner in series. The last meter is grounded through the impedance 33, matching the characteristic impedances of all the lines and suppressing all reflection effect. The common feeding line 34 connects in parellel all terminals of the position pulses collecting armatures to the amplifying and amplitude selecting device 52. The latter is connected to the radio transmitter 53 and antenna 54. The generator 37 comprises three capacitive couplings 39 placed side by side at the beginning of the artificial line 38, for picking up a triple tip signal and introducing it into the common supply line 34. The device 52 comprises an amplifying-selector stage, picking up, owing to its bias, only the position and pilot pulses of a substantial amplitude and blocking all parasitic pulses. It is of a conventional construction and does not need to be detailed.

The energizing pulses, after passing through the generator 37, are applied to the line 25 of the first meter, travel through it and appear on the input of the line 32 of the second meter, and travel thus successively through all the lines connected in series. Each artificial line will delay the travelling signal by an amount superior to the maximum delay which may present the position pulse of its meter. In each meter, the travelling signal, will induce through the action of the mobile pick up a position pulse applied through the collecting strip, to the line 34, the moment of this induction being fixed by the position of the corresponding pointer. Besides, the twin coupling at the beginning of each line will introduce a pilot signal and therefore each apparatus will be operated in the same conditions as those of the Figure 1. The movement of the pointer will modulate the position of the picked up pulse and therefore the time interval between it and the corresponding reference or pilot twin pulse. On the terminal 35 there will appear a train of 5 position modulated pulses, each of them preceded by a double pilot pulse.

The connections 34 and 36 transmitting these different pulses are by preference given the form of coaxial transmission lines, the characteristic impedance of which will be thoroughly matched. More particularly this impedance of the line 36 will be matched with the impedance of the artificial lines to avoid any parasitic reflection pulse.

The generator 37 is used to produce a characteristic impulse allowing the differentiation of the pulses generated by the different meters. The triple pip signal it produces will appear on the terminal 35 at the beginning of each scanning cycle. Owing to its total length, this pulse may be easily selected and used at the receiver for synchronising and distributing purposes.

Figure 4:
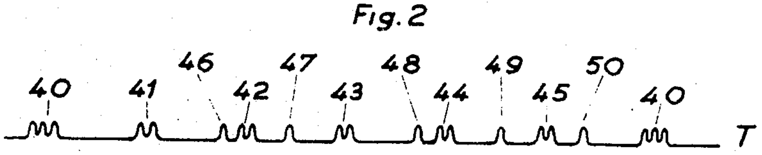
Figure 4 is a diagram of time displaced pulses generated by this transmitter.

The diagram of the Figure 4 represents the different pulses appearing on the terminal 35 during a complete cycle. 40 designates therein the triple synchronisation pulse heading the cycle; 41, 42, 43, 44 and 45 are the twin pilot pulses corresponding respectively to the meters 25—29; the position pulses of which are respectively 46, 47, 48, 49 and 50. Each of them can travel between fixed limits, and approach more or less the preceding pilot pulse. Their time position on the drawing correspond to the instantaneous position of the pointers on the Figure 3.

The delayed pulses collected on the terminal 51 may be fed back to the oscillator 30, in order to synchronise the frequency of repetition of the signal trains.

After being amplified and amplitude levelled in the device 52, these trains are fed to a usual transmitter 53 feeding an antenna 54. All parasitic pulses which may occur are of a relatively reduced amplitude and are blocked by the selector 52.

The condensers 55 to 59 are used to connect to the terminal 35, the capacitive pick-ups 39 of the generator 37, as well as the collectors of the meters. They may be calculated or adjusted so as to apply to the terminal 35, pulses having substantially the same amplitude.

These pulses transmitted at distance, on a convenient carrier, are received in a system arranged and adapted to read the different time intervals. It may namely be a system transforming the pulses into visible signs and reproducing optically their relative positions.

Figure 5A:
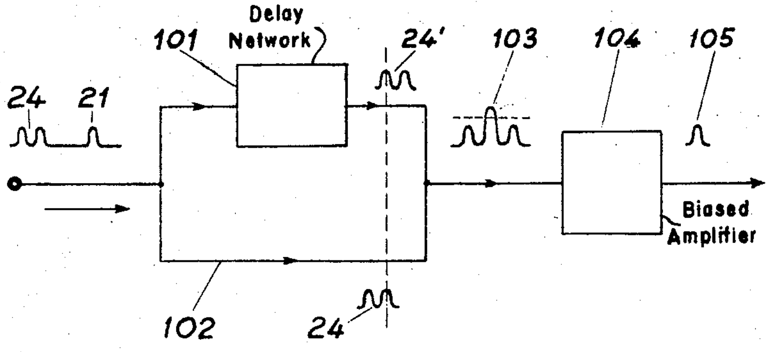
Figure 5A is a more detailed wiring diagram of the pilot pulses selector used in the receiver of Figure 5.
Figure 5:
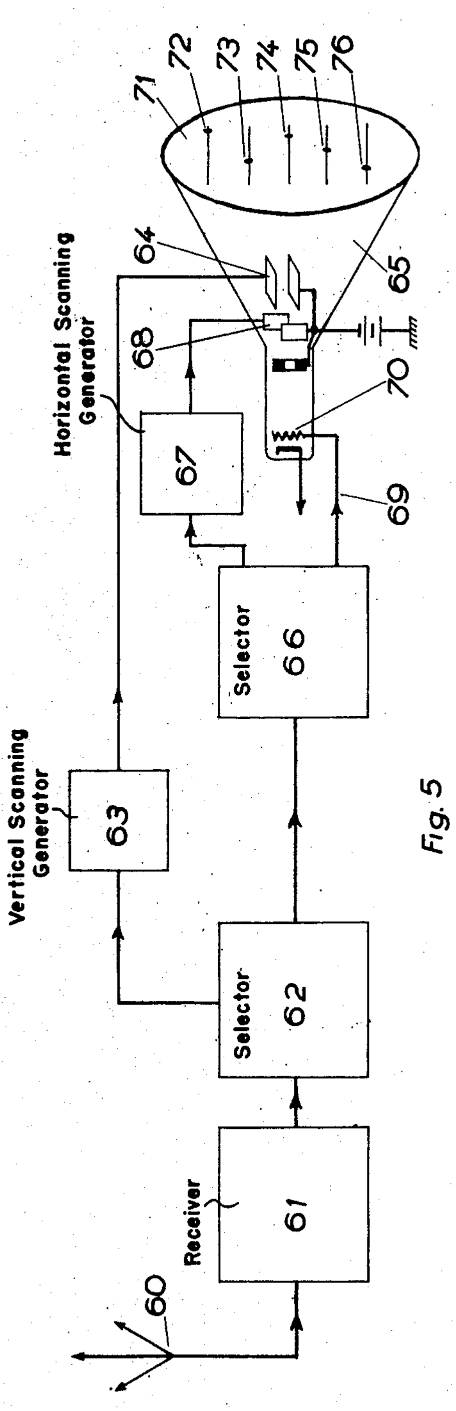
Figure 5 is a schematic view of a receiver comprising electrical circuits to receive, select and distribute these pulses, and a cathode ray tube on which their position is read.

The system of the Figure 5 represents such an optical receiver intended to observe simultaneously on the same viewing apparatus the indications of all the meters represented on the Figure 3. It comprises a single cathode ray tube on the screen of which appear brilliant spots corresponding to the position pulses. To each impulse corresponds a particular spot scanning its particular horizontal line. These lines are distributed in a vertical sense, like the scanning lines in a television receiver. The position each spot will occupy on its line will represent the time interval between the position pulse and the pilot pulse, the latter being used to fix the origin or zero of the scanning.

The signals are received by the aerial 60 and the usual receiving apparatus 61 and after their demodulation are applied to a selector included in the device 62, which picks up the triple tips synchronisation signals 40, and blocks all the others owing to the fact that they are of a substantially shorter duration. The selected pulses are applied to the scanning generator 63, which may be of a type generally used in a standard television receiver to insure the slow vertical sweeping of the screen, and may comprise, for instance, a relaxation generator controlled by the selected triggering pulses. This generator is connected to the vertical deflection plates 64 of the cathode ray tube 65 and controls the vertical scanning of its screen. The triggering pulse synchronises the deflector securing as usual the rapid return sweeping movement.

Another selecting device 66 which constitutes a part of the apparatus picks up the pilot twin pulses 41—45 and applies them to a scanning generator 67 connected to the horizontally deflecting plates 68 of the cathode ray tube, controlling in the same way as in the television receiver, the horizontal scanning. Each pulse starts the back movement of the ray. There will appear on the screen as many horizontal time bases as there are pilot pulses.

Finally the position pulses are applied, through the line 69 to the control cylinder 70 of the tube, so as to let appear on its screen luminous spots, 71—75, corresponding respectively to the said pulses and reproducing in space their time position modulation.

The scanning generators are of an usual current type and do not need to be detailed. The Figure 5A, described later, represents the circuits of one of the two selectors 62 and 63, operating in the same manner and different only by their involved electrical data.

As soon as a vertical synchronizing pulse is received, the ray, normally cut off, will begin its vertical scanning movement. At the same time, under the control of the horizontal deflector generator, it will begin to sweep in a more rapid manner, the screen horizontally. The beginning of the horizontal line will correspond to the pilot pulse reception. The position pulse arriving later will unblock the ray and give rise to a brillant spot spaced apart from the point of origin by a length that will correspond exactly to the time interval between the position and its pilot pulses and therefore reproduce the instantaneous position of the remote meter.

Owing to the gradually vertical deflection, the horizontal deflection lines may become slightly inclined. To correct it, either the tube may be slightly turned, or the charging method of the relaxation generator used for the vertical deflection may be modified in a suitable manner in order to insure, by changing its voltage form, a perfectly horizontal scanning. For instance, the selected pilot pulses may be used to charge, step by step, the vertical deflection condenser.

By applying the position pulse to a supplementary pair of deflecting plates, it is also possible to substitute for the luminous point a luminous transversal dash; the same result may be secured by introducing some astigmatism effect in the electronic optical system.

Figure 5A represents a diagram of an electronic selector, like 67 of the Figure 5, which may be used to pick up the twin pilot pulses such as 24 and block the single position pulses such as 21 of Figure 2. All the incoming pulses are applied to two parallel channels, one of which 102 lets them pass directly, the other comprising a delay network 101, calculated to introduce a suitable time lag, that is longer than a single pulse, but inferior to the total length of a twin pulse. Then the directly transmitted 24 and delayed 24' twin pulses will overlap in the common output and give rise to a combined pulse 103 with a well pronounced amplitude peak. A suitably biased amplifier 104 will block the position pulses and transmit only the peak 105 of the selected pilot pulse. By changing only the constants of the delay network it will be possible to pick up in the same manner the triple synchronising pulses and to block all the others.

Figure 6:
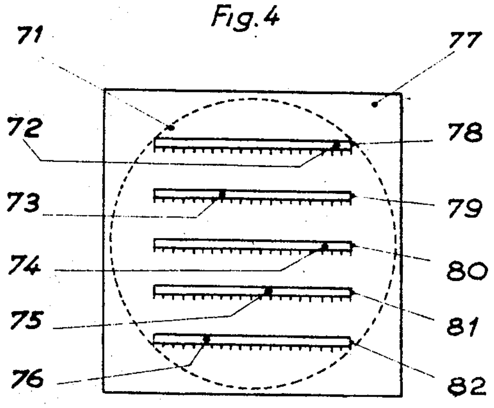
Figure 6 is an enlarged end view of the said cathode ray tube screen with time bases and luminous spots corresponding respectively to the scales and position pulses of the different remote meters.

Figure 6 represents the front view of the screen during the reception of the pulses generated by the apparatus of the Figure 3. The screen is covered by an opaque mask 77 with five horizontal slits 78—79 associated each with a suitable scale on which one can read separately the position of the luminous points 72—76 representing the indications of the remote meters.

This invention is not only limited to measuring apparatus comprising a movable pointer, but it may be extended to transmitting the physical state of all bodies which may move in space or vary in dimensions. Instead of a pointer, the movable coupling of the Figure 1 may be fixed to any kind of element the movement of which may modulate the pulses in position.

Figure 8:
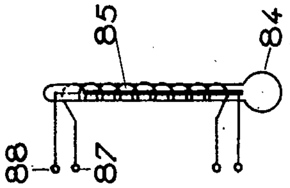
Figure 8 is a view of a modified form of a temperature transmitter using the reflection effect and requiring no mobile pick-up.
Figure 7:
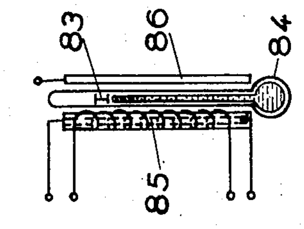
Figure 7 is a view of a modified embodiment of the transmitter, according to the invention, intended for temperature remote readings, comprising a thermometer combined with a pulse generator.

Figures 7 and 8 represent the invention as applied to the position pulse modulation by means of a thermometer. On the Figure 7, a float of a metal or dielectric substance 83, is displaced by the thermometer liquid 84, between an artificial line 85 and a collecting electrode 86. The float action is the same as this of the movable vane of the Figure 1, and the generated pulses will indicate the liquid level and therefore the temperature.

According to the embodiment of the Figure 8, the delay network is directly wound on the thermometer tubing. The energizing recurrent pulses are applied between the terminals 87 and 88, and travel through this network. The surface of the liquid column gives rise to a reflected pulse, owing to a sudden dielectric, or conductance, or magnetic permeability change, determined by the nature of the liquid substance: this echo pulse will return to the input of the artificial line, and its travelling delay which is function of the liquid height will correspond to the instantaneous level, and therefore to the temperature.

Figure 9:
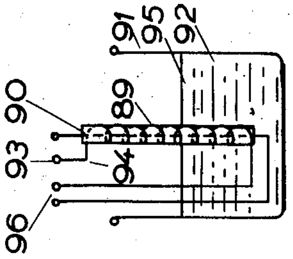

The same principle of reflection may be applied to direct measuring of level of liquid in any other device. According to the Figure 9, an artificial line 89 is coiled on a suport 90 immersed in the liquid 92 in a container 91. The energizing pulses are applied to the terminal 93, and leave the line at 96 where they can be absorbed. The discontinuity of travelling due to the sudden change of surrounding medium produces the reflected pulse the delay of which is proportional to the liquid level and which is collected on the input terminal.

It may be observed, that in all the described embodiments of the invention, the artificial line was swept or scanned directly, either by the capacitive pick-up fastened to the movable body, or by the liquid in moving along the line. The picking-up action was exerted in a perfectly continuous and accurate manner, the slightest displacement of the modulator giving rise to a corresponding delay of the position pulse.

According to the character of the scale used for the measuring purposes the artificial line may be coiled with a constant pitch in which case the delay will be directly proportional to the liquid level, or it may receive any other form satisfying any given measuring or displacement law.

Figure 10:
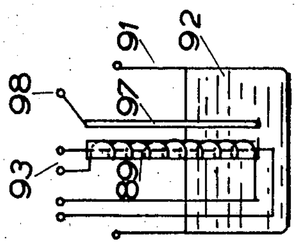
Figures 9 and 10 are views of two further embodiments of this invention, intended to transform into delayed pulses, the variable level of a liquid in a container, needing no moving pick-up means.

Figure 10 shows a modification of the level measuring apparatus. The latter receives a collecting electrode 97 intended to pick up through the liquid sheet itself the capacity changes between the line and this electrode, the pulses travelling in the line 93. The position pulses are then applied to the terminal 98.

Instead of using the vane 2 of the Figure 1 to change suddenly the capacity between the artificial line and the collector 3, the position pulse may be in some cases directly picked up from this vane by connecting it to an extensible leading out connection. The artificial line may be realized in many different manners other than those described above. For example, the supporting insulator core may receive a thin layer of a conducting substance, deposited namely by silver spraying. To avoid high frequency losses, a narrow insulating strip may be produced either by scratching the silver sheet or by using a suitable mask during the metallization. The whole is covered by a thin insulating sleeve on which is coiled the delay helix.

The time interval between the recurrent energizing pulses must be longer than the total travelling time or the time constant of the line. The latter may be, for example, chosen between 5 and 50 micro-seconds, and by choosing the pilot signal frequency of about 10,000 cycles per second, I have secured a continuous and practically instantaneous remote reading of electrical meters.

The position modulated pulse generator as described and illustrated in the Figure 1, may be used for all purposes where it is desired to transform the movement of a controlling means into delayed pulse, the time position of which characterizes the space position of this means.

The position pulses generated according to the present invention may be combined with other signals such as television pulses, in order to use the same transmitting equipment. They will then be introduced during the return movements of the line or image scanning, so as not to disturb the vision.

In the cases where the transmitting equipment of Figure 3 comprising the different meters is supposed to be carried by an air craft, in order to simplify it, it would be sometimes advisable to fix the timing generator on the ground and to transmit its energizing pulses by radio to the craft. This system may then be combined with a radio-altimeter operating by the echo method. But, in most cases, this generator of a simple design, of a small volume and of a reduced weight will be preferably left on the craft, and the system will then need only a single carrier.

Other modes of applying the principle of my invention may be employed instead of the ones explained, changes being made as regard the means therein disclosed, provided those stated by any of the following claims or their equivalent be employed.

I, therefore, particularly point out and distinctly claim as my invention:

1. Apparatus for transmitting at a distance the reading of a meter by means of position modulated pulses, comprising an artificial line associated with this meter, of a tubular form made by an insulated wire coiled as a helix and associated with a lengthwise extending conductor near the wire forming with it the distributed capacity of the line, two input terminals connected to the ends of the said wire and conductor, a matching resistance connected between the two other ends of the same, a collecting electrode of an elongated form associated in a capacitive relation with the said line, a capacitive pick up device between the line and the said electrode, fastened to the meter movable part, sweeping this line lengthwise and made of a material increasing substantially the coupling between the line and this electrode, means to apply between the said input terminals of the line a recurrent periodic pulse and an output terminal connected to the said collecting electrode, on which appear the delayed pulses.

2. Apparatus for transmitting at a distance the position of a meter pointer by means of position modulated pulses, comprising an artificial line of an elongated form associated to this meter and so spaced with respect to the latter that the pointer sweeps it lengthwise, a band shaped collecting electrode extending lengthwise opposite the line and forming the armature of a capacitive coupling with it, a vane fastened to the pointer and placed between the line and this collecting electrode, this vane being of a material changing substantially the electrostatic coupling between the line and this electrode, means to apply to the input of this line a recurrent periodic pulse, matching means associated to the end terminals of the line, fixed capacitive coupling means associated with the input end of this line and connected to the collecting electrode, and an output terminal connected to this electrode.

3. Apparatus as claimed in the claim 1, in which the pick up device is made of a metallic sheet.

4. Apparatus as claimed in the claim 1, in which the pick up device is made of an insulator block of a high dielectric constant.

5. System for transmitting at a distance the position of several meters comprising an artificial line associated with each meter, a collecting armature of elongated form associated in a capacitive relation with each line, a capacitive pick up device fastened to each meter pointer between the line and its corresponding collecting armature, sweeping this line lengthwise and producing a substantial increase of coupling between the line and the armature, a fixed coupling of a particular shape between the beginning of each line and its collecting armature, all these armatures being connected in parallel to a common output terminal, all these lines being connected in series to a common input, means to apply to this input a recurrent periodic pulse, so as to produce at the common output a train of fixed pilot and position modulated pulses, means to introduce in this output, at the beginning of each train, a particular synchronising pulse, and a high frequency transmitter connected to the said common output.

6. System for transmitting at a distance the position of several meters, comprising an artificial line associated with each meter, a collecting armature of elongated form associated in a capacitive relation with each line, a capacitive pick up device fastened to each meter pointer between the line and its collecting armature, sweeping the line lengthwise and producing a substantial increase of coupling between the line and the armature, a fixed capacitive coupling of a particular shape between the beginning of each line and its collecting armature, all these armatures being connected in parallel to a common output terminal, all these lines being connected in series and through a supplementary artificial line to a single energizing generator of recurrent periodic pulses travelling successively through all these lines and producing in the common output a train of fixed pilot and position modulated pulses, a fixed capacitive coupling of a particular shape between the input of the said supplementary line and the common output, introducing therein a synchronising pulse of a particular form, and a single high frequency transmitter connected to this output and modulated by this train of pulses.

7. System for remote observation of the position of several meters, comprising at the transmitter end a system as claimed in the claim 5, and at the receiver end a single cathode ray tube, means to modulate its electronic beam in accordance with the incoming position modulated pulses, horizontally and vertically scanning generators associated with the deflectors of this tube, and means to separately pick up the pilot and synchronising pulses and to apply them respectively to the said generators in order to control their deflecting action.

8. In an apparatus for telemetering and similar purposes by means of position modulated electric pulses, an artificial transmission line of elongated form comprising two conductors forming distributed parallel capacities and series inductances, at least one of which in the shape of a helix, a body in a direct close frictionless electric relation with the said helix, means for moving said body along a definite operating trajectory, said artificial line extending lengthwise in closely spaced relationship with said trajectory so as to maintain said electric relation in any one of the operating positions of said body, means for feeding said line with a short recurrent electrical energizing pulse so as to produce therein a single delayed travelling pulse, means to match this line, said body being of such a nature as to produce a position pulse lagging said energizing pulse by a time interval which characterizes the momentary position of said body, an output circuit connected to said line and receiving said position pulse, and means for producing a recurrent characteristic pilot signal in a fixed time relationship with the said energizing pulse.

9. In an apparatus for telemetering purposes by means of position modulated pulses, means moving along a definite trajectory, an artificial transmission line of an elongated form comprising two conductors forming distributed parallel capacities and series inductances, at least one of which in the shape of a helix, extending substantially in the same direction and in a definite spaced relation with said trajectory, said means being located near and opposite said helix in direct electrostatical coupling relation therewith, the helix turns forming one armature of said capacitive coupling, means for feeding said artificial line with a recurrent pulse so as to produce therein a single delayed travelling pulse, and means for producing a recurrent characteristic pilot signal in a fixed time relationship with said feeding pulse.

10. In an apparatus for generating position modulated pulses characterizing the instantaneous position of a part moving along a predetermined trajectory, an artificial transmission line of an elongated form comprising a helically wound conductor in close capacitive relationship with another conductor of said line, extending lengthwise substantially in the same direction as said trajectory and in definite spaced relationship therewith, means associated with said part so as to be driven by it, said means being located near and opposite said helical conductor in direct electrostatic coupling relation therewith, the helical turns forming one armature of said capacitive path, and means for feeding said line with a recurrent pulse so as to produce therein a single delayed travelling pulse.

11. In an apparatus for generating position modulated pulses characterizing the momentary position of a part moving along a predetermined trajectory, an artificial transmission line of an elongated form comprising a helically wound conductor in close capacitive relation with another conductor of said line, said conductors forming the distributed parallel capacities and inductances of the line, the latter extending lengthwise substantially in the same direction and in definite spaced relation with said trajectory, a metal vane fixed to and driven by said movable part located near and opposite said helical conductor and forming one armature of a direct capacitive coupling therewith, the turns of which form the other armature of said coupling; and means for applying to said line a recurrent feeding pulse so as to produce therein a delayed travelling pulse.

12. In an apparatus for generating position modulated pulses characterizing the momentary position of a part moving along a predetermined trajectory, a coupling vane associated with and driven by said part, an artificial line comprising two conductors at least one of which in the shape of a helix, in close a capacitive relation, forming distributed parallel capacities and series inductances of the line, the latter extending lengthwise in closely spaced relationship with said vane, a continuous fixed electrode of an elongated shape extending opposite said helix at a certain distance therefrom and in relatively feeble electrostatic coupling therewith, said vane being located freely between the said helix and said electrode and in direct electrostatic coupling relation with both of them, and said vane increasing substantially and locally the coupling between the helix turns and said electrode.

13. In an apparatus for telemetering purposes by means of position modulated electrical pulses, comprising a metering device with a movable pointer having a predetermined trajectory, an artificial transmission line comprising two conductors forming distributed parallel capacities and series inductances, at least one of which in the shape of a helix, a coupling vane fixed to and driven by said pointer and located near and opposite said helix turns and creating a capacitive path one armature of which is formed by said turns, said artificial line extending lengthwise in such closely spaced relation to said vane operating trajectory that said capacitive path is maintained all along said last-mentioned trajectory, means for feeding said line with a recurrent energizing pulse, and means to produce a recurrent pilot pulse in a fixed time relation with said energizing pulse.

14. In an apparatus for transmission of position by means of electrical position modulated pulses, a metering device comprising a mobile indicator part moving along a predetermined trajectory, an artificial transmission line comprising two conductors in close capacitive coupling relation, at least one of which is in the form of a helix, said line extending lengthwise substantially in the same direction and in fixed spaced relationship with said trajectory, a continuous stationary electrode extending lengthwise opposite to said helix at a certain distance therefrom and in a direct relatively feeble capacitive coupling relation with the helix turns, the latter forming one armature of said coupling, a vane fixed to said indicator part and located between said electrode and helix in close adjacency thereto so as to be in a direct capacitive relation therewith, the trajectory of said vane passing between said electrode and helix and said vane increasing locally and substantially the capacity therebetween, a pulse generator for feeding recurrent pulses into said line, an output circuit for the position modulated pulse, said generator and output circuit being connected in series through said coupling vane with the portion of the artificial line between its terminal corresponding to the starting position of said indicator part and its point facing the vane so that a pulse, corresponding in position in time to the position of said vane, lags said feeding recurrent pulse by a time interval corresponding to the travelling duration in said portion, and means to produce a recurrent pilot signal in fixed time relationship with said recurrent pulse.

15. In an apparatus for telemetering purposes, by means of position modulated pulses, a container of an elongated shape containing a liquid column the level of which undergoes variations, an artificial transmission line extending in the same direction as said container, associated with the latter so as to be in close spaced relation with said liquid column all along its length, means to feed said line with recurrent periodic pulses so as to produce therein delayed travelling pulses, said liquid being of such a nature as to reflect said pulses, and an output circuit connected with said line on which appear said reflected pulses.

16. In an apparatus for telemetering purposes by means of position modulated pulses, a metering device, a continuous artificial transmission line of elongated shape, a generator for feeding said line with a recurrent energizing pulse to produce therein a single delayed travelling pulse, an output circuit for the position pulse, coupling means driven by the movable part of said metering device sweeping the line lengthwise and connecting in series said generator with the said output through a variable portion of said line fixed by the positions of said coupling means, and means controlled by said generator producing a recurrent pilot pulse of a particular characteristic shape in fixed time relation with said energizing pulse.

PAUL FRANÇOIS MARIE GLOESS.

REFERENCES CITED

The following references are of record in the file of this patent:

UNITED STATES PATENTS

| Number | Name | Date |
|---|---|---|
| 1,671,143 | Campbell | May 29, 1928 |
| 2,226,728 | Lalande | Dec. 31, 1940 |
| 2,403,561 | Smith | July 9, 1946 |
| 2,403,890 | Johnson | July 9, 1946 |
| 2,457,819 | Hoeppner | Jan. 4. 1949 |